(12) United States Patent
Nakamura

(10) Patent No.: US 7,190,533 B2
(45) Date of Patent: Mar. 13, 2007

(54) LENS APPARATUS AND IMAGE-TAKING APPARATUS

(75) Inventor: Hidekazu Nakamura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/350,466

(22) Filed: Feb. 8, 2006

(65) Prior Publication Data
US 2006/0268434 A1   Nov. 30, 2006

(30) Foreign Application Priority Data
May 25, 2005   (JP)   ............................. 2005-152263

(51) Int. Cl.
*B02B 7/02* (2006.01)
(52) U.S. Cl. ...................... 359/811; 359/819; 359/813; 359/814
(58) Field of Classification Search ................ 359/811, 359/813, 814, 819, 821, 822, 823, 826, 687, 359/686
See application file for complete search history.

(56) References Cited

U.S. PATENT DOCUMENTS 6,989,865 B1 * 1/2006 Ohta ......................... 348/347
7,092,171 B2 * 8/2006 Kawaguchi .................. 359/704
2005/0083590 A1 * 4/2005 Tanigawa et al. ........... 359/819
2005/0231831 A1 * 10/2005 Araki ......................... 359/823

FOREIGN PATENT DOCUMENTS

JP   7-120663   5/1995

* cited by examiner

*Primary Examiner*—Timothy Thompson
(74) *Attorney, Agent, or Firm*—Morgan & Finnegan, LLP

(57) ABSTRACT

A lens apparatus is disclosed, which allows an optical adjustment of each lens unit, and facilitates the assembly and maintenance. The lens apparatus comprises a plurality of lens units constituting an image-forming optical system that forms an object image, and a plurality of lens-holding members holding the plurality of lens units, respectively. Each of the lens units and the lens-holding member holding the lens unit are unitized. The lens apparatus is formed by joining each of the plurality of lens-holding members to at least one of the other lens-holding members.

12 Claims, 5 Drawing Sheets

LENS APPARATUS AND IMAGE-TAKING APPARATUS

BACKGROUND OF THE INVENTION

The present invention relates to lens apparatuses such as zoom lenses, and to image-taking apparatus with the same, such as digital cameras and video cameras.

Conventional image-taking apparatuses, such as digital cameras and video cameras, are known on which an interchangeable rear focus zoom lens can be mounted or a rear focus zoom lens is provided integrally. The rear focus zoom lens (or inner focus zoom lens) includes a magnification-varying lens, and a focus lens disposed at a position closer to an image plane than the magnification-varying lens. The focus lens corrects (or compensates) image plane displacements caused by the movement of the magnification-varying lens, and performs focusing.

The above-described rear focus zoom lens is generally constituted by a front lens unit (or first lens unit), a variator lens unit (or second lens unit) for varying the magnification, an afocal lens unit (or third lens unit), and a focus lens unit (or fourth lens unit) having a compensating function, the lens units being arranged in order from the object side to the image side.

In a lens apparatus with such a rear focus zoom lens, the focus lens unit, the afocal lens unit, a stop unit, and the variator lens unit are assembled in this order on a rear barrel that is a base member on which an image-pickup element, such as a CCD sensor, is mounted. And finally, the front lens unit is assembled on the rear barrel.

FIG. 5 shows an example of such a conventional rear focus zoom lens. In FIG. 5, 61 denotes a first lens unit, 62 a second lens unit, 63 a third lens unit, and 64 a fourth lens unit.

The first lens unit 61, second lens unit 62, third lens unit 63, and fourth lens unit 64 are held by first lens-holding member 65-1, second lens-holding member 65-2, third lens-holding member 623, and fourth lens-holding member 627, respectively.

The second lens unit 62 is moved with the movement of the second lens-holding member 65-2 that is guided by a straight-proceeding key 611 provided on a fixed lens barrel 610. The fourth lens unit 64 is moved with the movement of the fourth lens-holding member 627 that is guided by a straight-proceeding key 625 provided on the fixed lens barrel 610.

The first lens-holding member 65-1 and third lens-holding member 623 are held by the fixed lens barrel 610.

In a zoom lens apparatus disclosed in Japanese Patent Laid-Open Application No. H7-120663, a first lens barrel unit in which the first lens unit and the second lens unit are unitized and a second lens barrel unit in which the third lens unit and the fourth lens unit are unitized are assembled to each other for facilitating the assembly and optical adjustment of the lens apparatus.

However, in the conventional zoom lens apparatus shown in FIG. 5, the straight-proceeding keys guiding straight the lens-holding members that hold the second and fourth lens units are provided on the fixed lens barrel that holds the first and third lens units. Therefore, it is difficult to make an optical adjustment of each lens unit (for example, adjustment of tilting and decentering with respect to the optical axis) separately from the other lens units.

In addition, since the fixed lens barrel holding the first to fourth lens units has a long length in the optical axis direction, mounting the third and fourth lens unit into the fixed lens barrel needs extra efforts, and the maintenance is difficult.

Moreover, in the zoom lens apparatus disclosed in Japanese Patent Laid-Open Application No. H7-120663, since a lens barrel unit is constituted by two lens units, it is difficult to make the optical adjustment of each lens unit separately from the other lens unit.

BRIEF SUMMARY OF THE INVENTION

An object of the present invention is to provide a lens apparatus allowing an optical adjustment of each lens unit, adjustment which is separated from that of other lens units, and facilitating the assembly and maintenance, and to provide an image-taking apparatus with the same.

A lens apparatus that is one aspect of the present invention comprises a plurality of lens units constituting an image-forming optical system that forms an object image, and a plurality of lens-holding members holding the plurality of lens units, respectively. Each of the lens units and the lens-holding member holding the lens unit are unitized. The lens apparatus is formed by joining each of the plurality of lens-holding members to at least one of the other lens-holding members.

Other objects and further features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Figure 1:
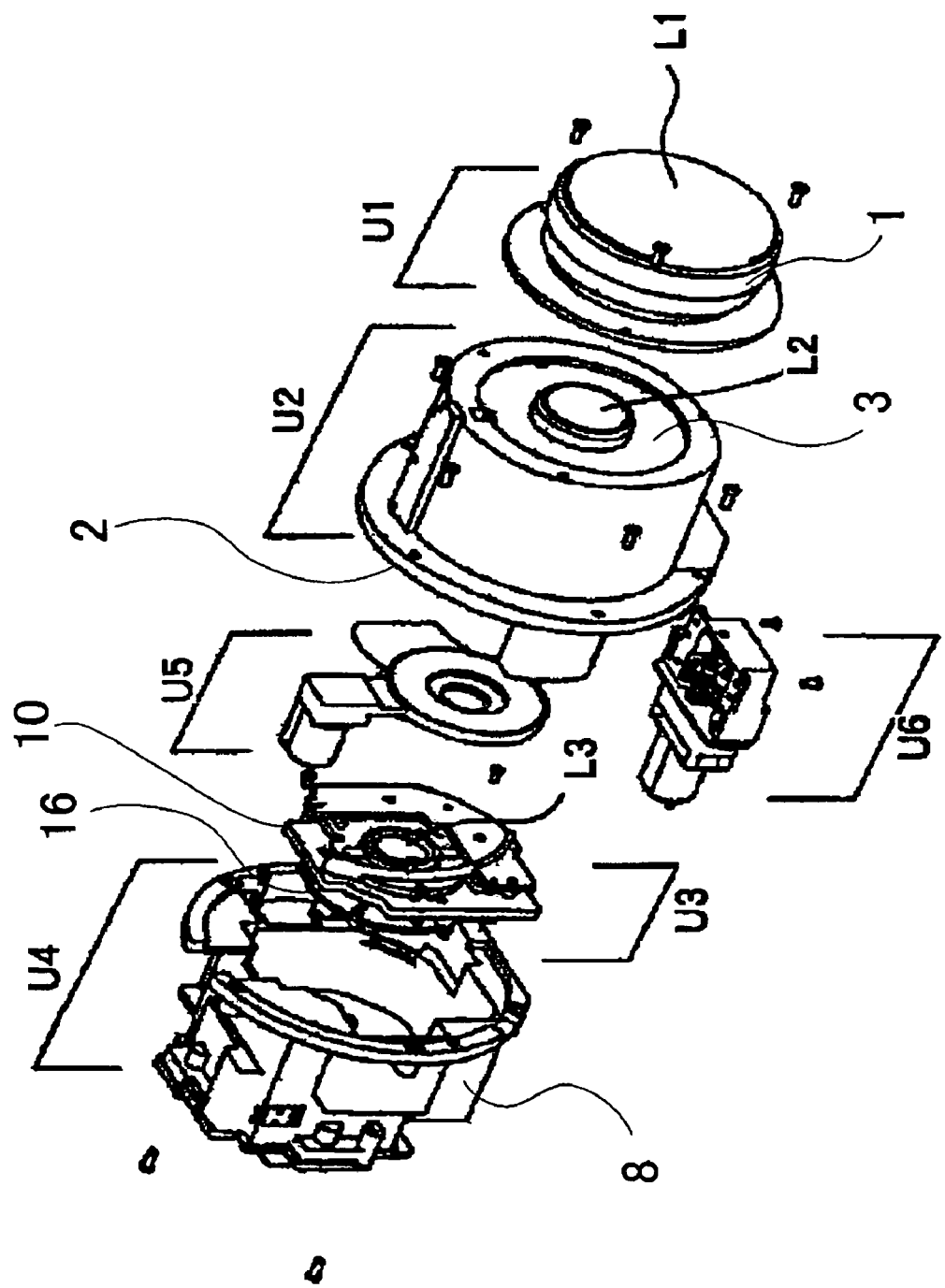
FIG. 1 is a perspective view showing the zoom lens apparatus that is an embodiment of the present invention.
Figure 2:
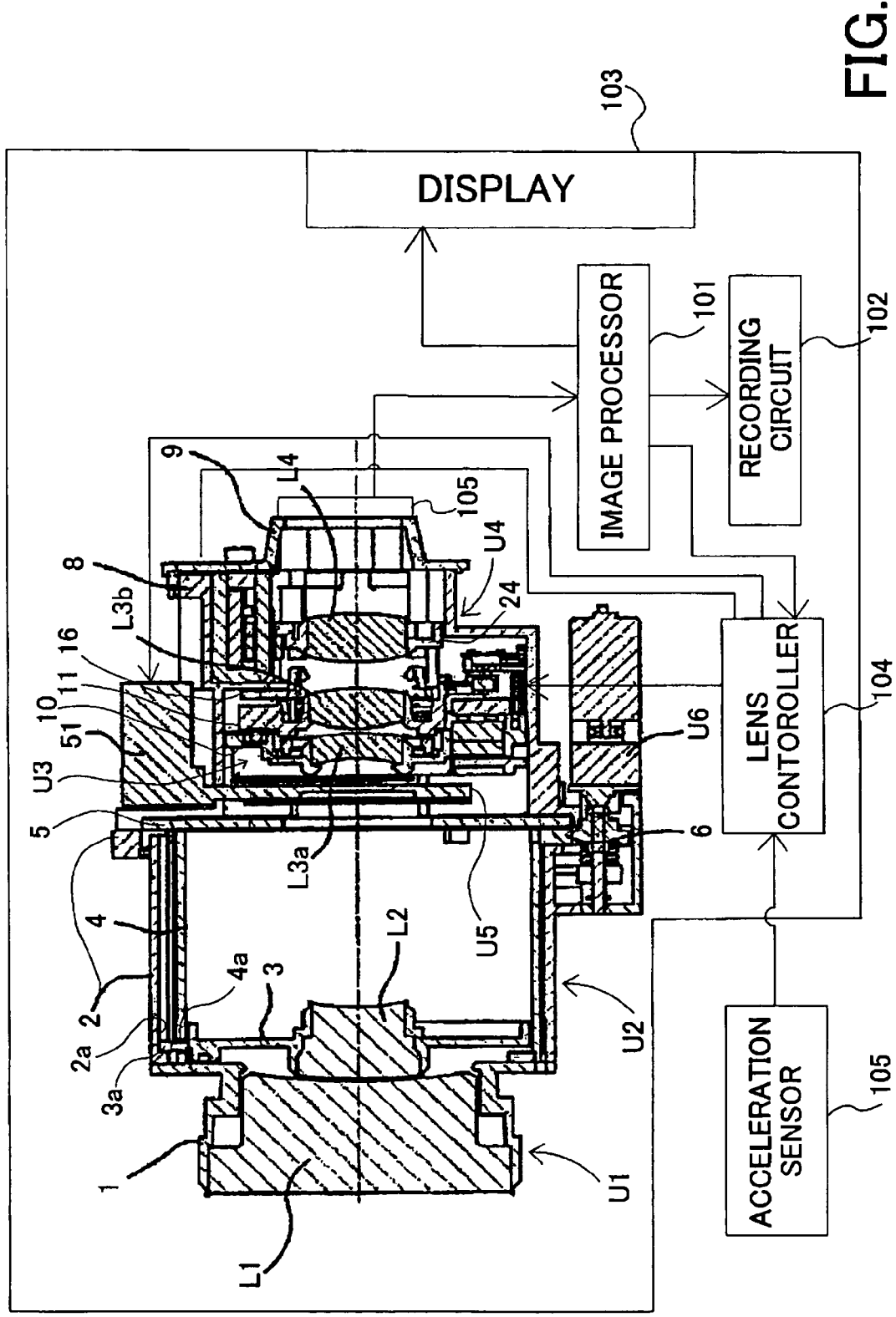
FIG. 2 is a sectional view showing a video camera including the zoom lens apparatus of the embodiment.

FIGS. 1 and 2 show the structure of the zoom lens barrel (lens apparatus) that is an embodiment of the present invention.

As shown in FIGS. 1 and 2, the zoom lens barrel of this embodiment holds a rear focus zoom optical system, as an image-forming optical system, which is constituted by four lens units L1 to L4 that are convex (positive), concave (negative), convex (positive), and convex (positive), respectively, in order from an object side (right side in the figure).

L1 denotes a fixed front lens unit as a first lens unit, L2 a variator lens unit as a second lens unit that moves in the optical axis direction to vary the magnification.

L3 denotes an image-stabilizing lens unit that shifts in a direction orthogonal to the optical axis to optically correct image shakes caused by camera shakes. The image-stabilizing lens unit L3 is constituted by a fixed lens element L3*a* and a shift lens element L3*b*.

L4 denotes a focus lens unit as a fourth lens unit that moves in the optical axis direction to perform focusing.

In this embodiment, four lens barrel units U1 to U4 holding these lens units L1 to L4, respectively, are formed; each lens barrel unit is independent of the other lens barrel units.

Although each of the lens units L1 to L4 seems to be constituted by one lens element in the figure, each lens unit is actually constituted by one or more lens elements.

U1 denotes a front lens barrel unit holding the front lens unit L1, and U2 a variator lens barrel unit holding the variator lens unit L2 movably in the optical axis direction.

U3 denotes an image-stabilizing lens barrel unit holding the image-stabilizing lens unit L3, and U4 a focus lens barrel unit holding the focus lens unit L4 movably in the optical axis direction.

U5 denotes a stop unit changing the amount of light passing through the zoom lens barrel, and U6 a variator motor unit driving the variator lens unit L2 in the variator lens barrel unit U2.

In this embodiment, since each of the lens barrel units U1 to U4 is independent of the other barrel units, the optical adjustment of each lens unit can be made independently without affecting the other lens units. Therefore, combining and joining these lens barrel units U1 to U6 make it possible to assemble the zoom lens barrel including four lens units L1 to L4 that constitute the image-forming optical system.

FIG. 2 shows the general structure of a video camera including the zoom lens barrel.

105 denotes an image-pickup element such as a CCD sensor or a CMOS sensor. The output signals from the image-pickup element 105 are input into an image processor 101. The image processor 101 executes image processing of the input signals to generate image signals. The image signals are recorded on a recording medium such as a semiconductor memory, optical disk, or magnetic tape, in a recording circuit 102. In addition, the image signals are displayed on a display 103 provided on the back or side of the camera.

104 denotes a lens controller. The lens controller 104 generates AF evaluation signals from the image signals and brightness signals taken from the image processor 101, and controls drive of a stop actuator 51 provided on the stop unit U5 and a focus motor, not shown in the figure, provided on the focus lens barrel unit U4 to perform automatic light amount adjustment and automatic focusing.

110 denotes an acceleration sensor. The lens controller 104 controls drive of an optical image-stabilizing mechanism including the image-stabilizing lens unit L3 based on vibration signals from the acceleration sensor 110.

The lens controller 104 drives the variator motor unit U6 in accordance with an operation direction of a zoom switch, not shown in the figure, to vary the magnification, the zoom switch operation being made by a photographer. At this time, the lens controller 104 controls drive of the focus motor so as to correct the displacement of the image plane associated with the magnification varying to maintain an in-focus state.

Figure 3:
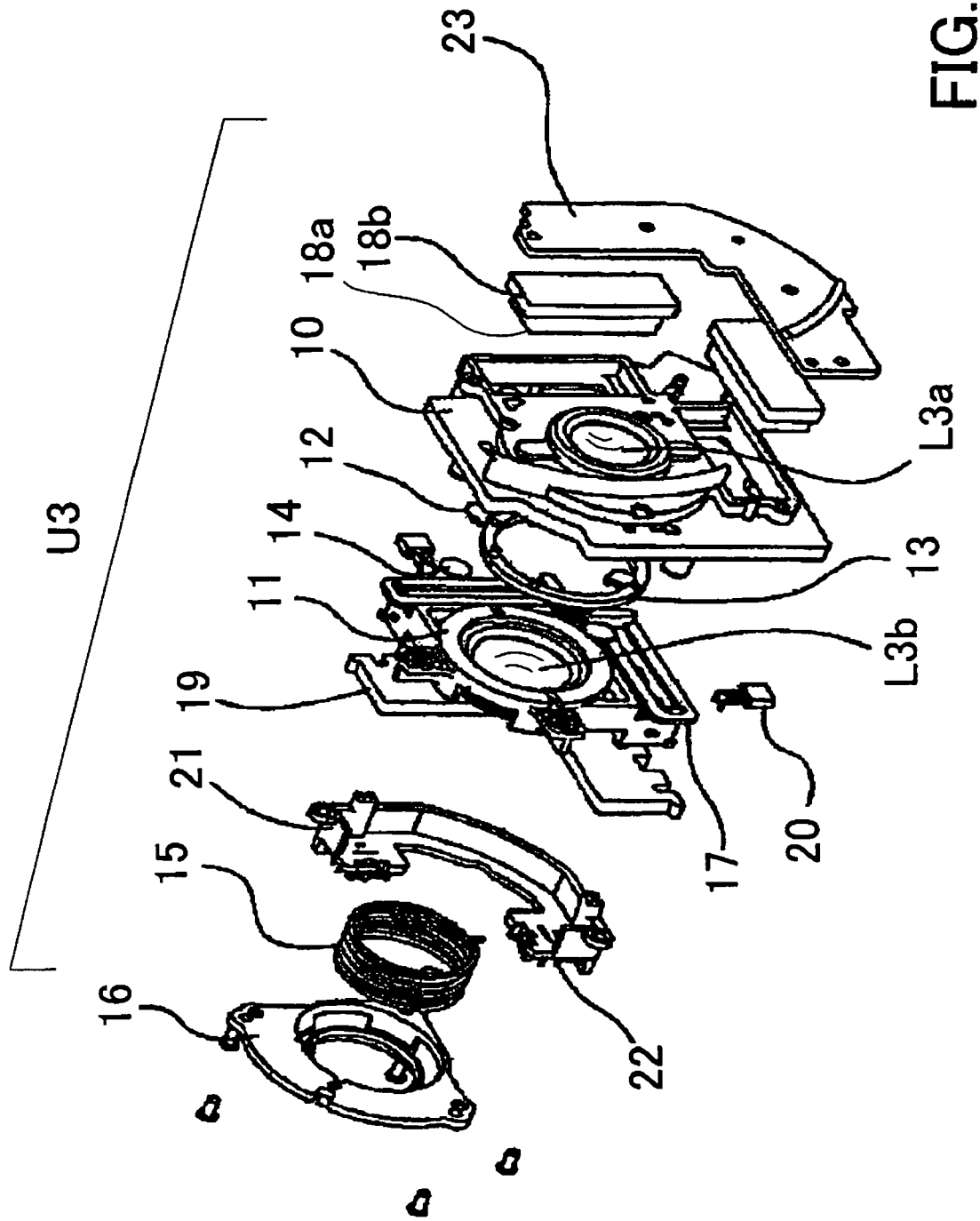
FIG. 3 is an exploded perspective view showing the shift lens barrel unit constituting the zoom lens apparatus of the embodiment.
Figure 4:
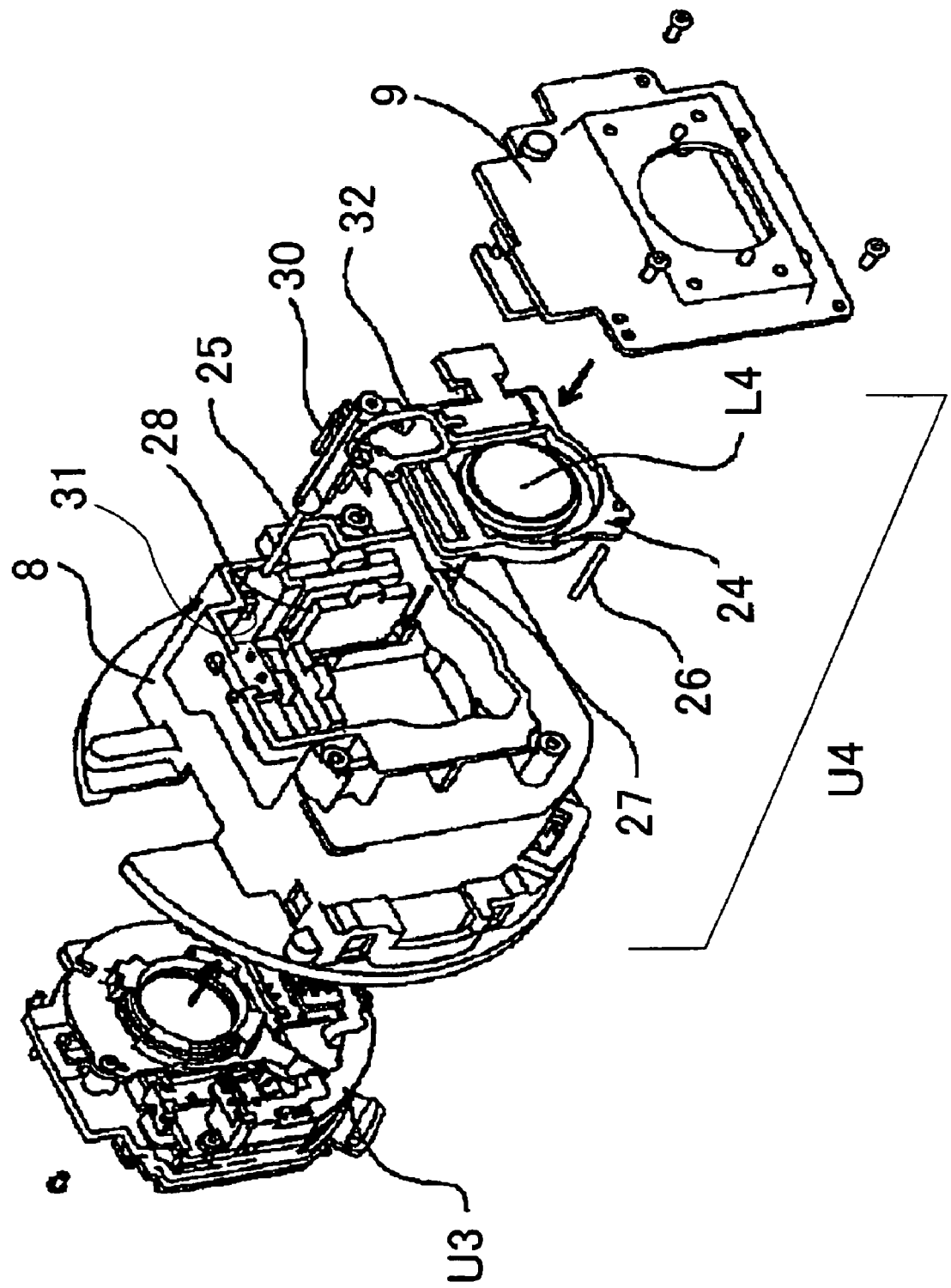
FIG. 4 is an exploded perspective view showing the focus lens barrel unit constituting the zoom lens apparatus of the embodiment.
Figure 5:
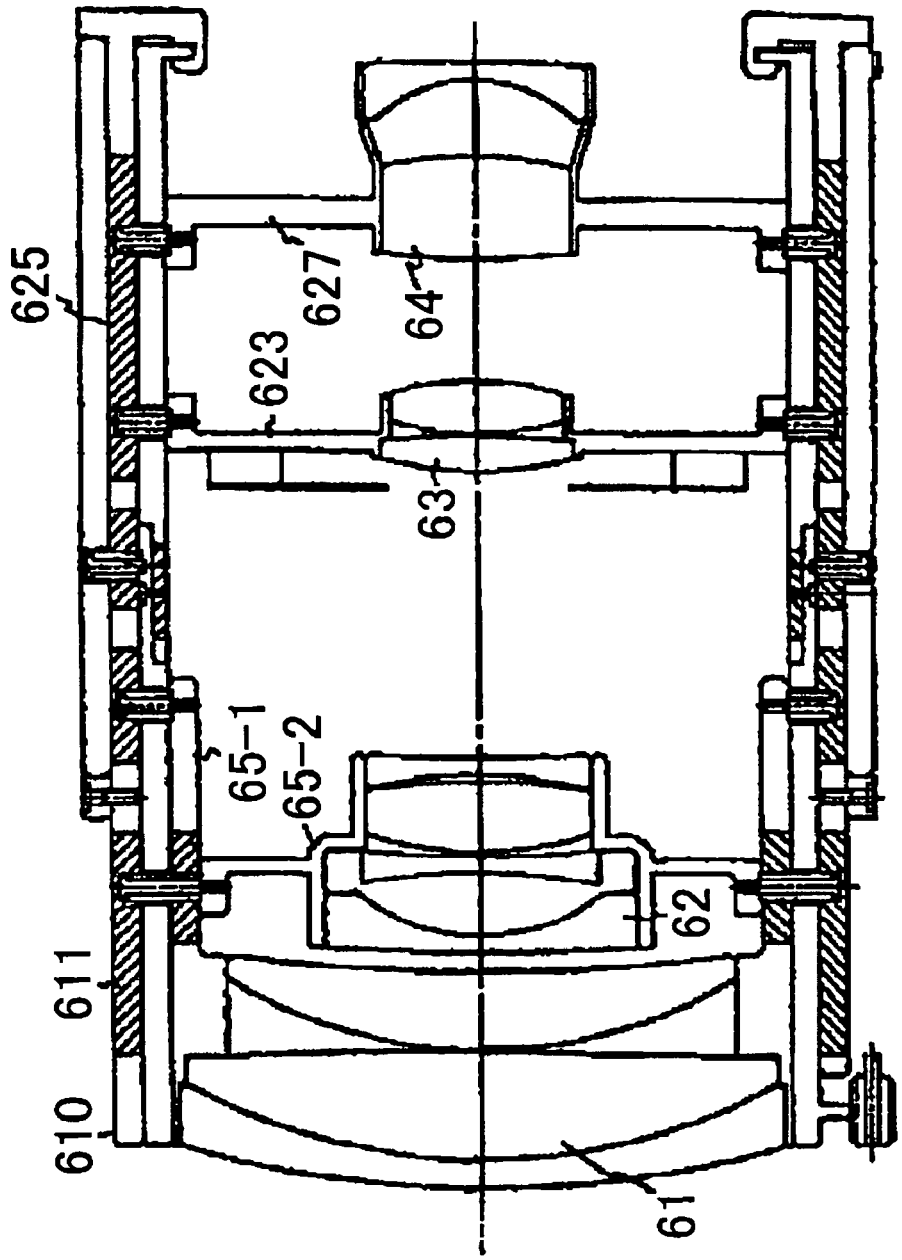
FIG. 5 is a sectional view showing a conventional zoom lens apparatus.

Next, the description will be made of the detailed structure of each of the lens barrel units U1 to U4 and the stop unit U5 with reference to FIGS. 2 to 4.

First, the description will be made of the front lens barrel unit U1 with reference to FIG. 2. 1 denotes a first lens barrel that is a first lens-holding member holding the front lens unit L1. The front lens barrel unit U1 is unitized as an independent lens-holding unit.

Next, the description will be made of the variator lens barrel unit U2. 3 denotes a variator-holding member holding the variator lens unit L2. 2 denotes a fixed lens barrel. A cam ring 4 is arranged inside of the fixed lens barrel 2. The variator-holding member 3 and fixed lens barrel 2 constitute the second lens-holding member.

The cam ring has a cam groove portion 4a with which a cam follower 3a provided on the variator-holding member 3 engages.

The inner circumferential surface of the fixed lens barrel 2 has a straight-proceeding groove portion 2a extending in the optical axis direction. The cam follower 3a engages with the straight-proceeding groove portion 2a.

The output gear of the variator motor unit U6 attached on the fixed lens barrel 2 engages with a gear member 6 fixed on the outer circumferential surface of the cam ring 4. The rotation of the cam ring 4 caused by the rotational power of the variator motor unit U6 drives the variator-holding member 3 (that is, the variator lens unit L2) in the optical axis direction, the rotation of the variator-holding member 3 being prevented by the straight-proceeding groove portion 2a.

At this time, the variator-holding member 3 is guided by a guide bar, not shown in the figure, in the optical axis direction. Both ends of this guide bar are held by the fixed lens barrel 2 and a holding member 5 fixed on the rear end (end on the image plane side) of the fixed lens barrel 2.

The position of the variator lens unit L2 is detected by a linear potentiometer, not shown in the figure, that is a variable resistor.

The variator lens barrel unit U2 as an independent lens-holding unit is constituted by unitizing the above-mentioned members.

Next, the description will be made of the image-stabilizing lens barrel unit U3 constituting an optical image-stabilizing mechanism with reference to FIG. 3. 10 denotes a fixed-lens-holding member. The fixed-lens-holding member 10 holds the fixed lens element L3a of the image-stabilizing lens unit L3. In addition, the fixed-lens-holding member 10 holds a shift lens holding member 11 movably in the direction orthogonal to the optical axis. Magnets 18a and yokes 18b and 19 that constitute part of an actuator for driving the shift-lens-holding member 11 in the direction orthogonal to the optical axis are attached to the fixed-lens-holding member 10. 23 denotes a cover member for preventing the magnets 18a and yokes 18b and 19 from dropping off the fixed-lens-holding member 10 in the optical axis direction.

The shift-lens-holding member 11 holds the shift lens element L3b. The shift-lens-holding member 11 also holds magnet coils 17 that constitute part of the actuator for driving the shift-lens-holding member 11. The third lens-holding member is constituted by the fixed and shift-lens-holding members 10 and 11.

Furthermore, slide members 12 and 14 for smoothing the movement of the shift-lens-holding member 11 in the direction orthogonal to the optical axis are attached to three portions of the fixed and shift-lens-holding members 10 and 11, respectively.

The shift-lens-holding member 11 is biased forward (on the side closer to the fixed-lens-holding members 10) by a spring 15 whose one end is fixed to a shift-lens-pressing member 16 that is arranged rearward of the shift-lens-holding member 11, thereby causing the slide members 12 and 14 to contact one another under pressure.

The shift-lens-pressing member 16 is fixed to the fixed-lens-holding member 10 by screws. In addition, a light-emitting element 20 for detecting the position of the shiftlens-holding member 11 (that is, the shift lens element L3b) is bonded to the shift-lens-holding member 11 with an adhesive.

On the other hand, a light-receiving-element-holding member 21 is fixed to the fixed-lens-holding member 10 by screws. A light-receiving element 22 for detecting the position of the shift-lens-holding member 11 is bonded to the light-receiving-element-holding member 21 with an adhesive.

Each of the lens elements L3a and L3b is constituted by one or more lens elements.

The image-stabilizing lens barrel unit U3 as an independent lens-holding unit is constituted by unitizing the above-mentioned members.

Next, the description will be made of the focus lens barrel unit U4 with reference to FIG. 4. 8 denotes a rear lens barrel that is a base member of the focus lens barrel unit U4. 9 denotes an image-pickup element holder that holds the image-pickup element 105. The image-pickup element holder 9 also holds an optical filter such as an infrared cutting filter or a low-pass filter. The image-pickup element holder 9 also has a role of a cover closing the rear end of the rear lens barrel 8.

The rear lens barrel 8 and image-pickup element holder 9 support both ends of two guide bars 25 and 26.

24 denotes a focus-moving member holding the focus lens unit L4. The focus-moving member 24 is supported movably in the optical axis direction by the guide bars 25 and 26. A magnet coil 27 constituting part of a voice coil motor is attached to the focus-moving member 24. The voice coil motor is the actuator driving the focus-moving member 24 in the optical axis direction. A magnet 28 constituting part of the voice coil motor is attached to the inside surface of the rear lens barrel 8. The fourth lens-holding member is constituted by the rear lens barrel 8 and the focus-moving member 24.

31 denotes a magnetoresistive element for detecting the movement amount of the focus-moving member 31. 30 denotes a magnet member used with the magnetoresistive element 31, the magnet member 31 being bonded to the focus-moving member 31 with an adhesive. On the magnetoresistive element 31, two magnetic poles are provided alternately in the optical axis direction at predetermined intervals.

The focus-moving member 24 has a protrusion, not shown in the figure. When the focus-moving member 24 is moved to a position where the protrusion shields a photo interrupter, not shown, fixed on the inside surface of the rear lens barrel 8, the photo interrupter detects that the focus-moving member 24 (that is, the focus lens unit L4) is located at the reference position for controlling drive thereof.

The focus lens barrel unit U4 as an independent lens-holding unit is constituted by unitizing the above-mentioned members.

Next, the description will be made of the stop unit U5. The stop unit U5 is an iris diaphragm having six light-shielding blades (not shown) that change the diameter of the aperture through which an image-taking luminous flux passes to adjust the amount of light reaching the image-pickup element 105. The light-shielding blades are driven by the stop actuator 51.

Next, the description will be made of the assembling sequence of the zoom lens barrel constituted by the above-mentioned barrel units U1 to U4 and the stop unit U5.

First, the front lens barrel unit U1 is fixed to the fixed lens barrel 2 that constitutes the variator lens barrel unit U2 by screws.

Then, the image-stabilizing lens barrel unit U3 and stop unit U5 are fixed to the rear barrel 8 that constitutes the focus lens barrel unit U4 by screws.

As the final step, the fixed lens barrel 2 of the variator lens barrel unit U2 is fixed to the rear barrel 8 of the focus lens barrel unit U4 by screws. The zoom lens barrel having the first to fourth lens units L1 to L4 and the stop unit U5 is thus assembled.

The decentering and tilting of the lens unit in each lens barrel unit are adjusted before assembling the zoom lens barrel as mentioned above. Since one lens barrel unit is constituted for one lens unit in this embodiment, it is possible to easily make this optical adjustment for each lens barrel unit separately from the other lens barrel units (or lens units).

After the optical adjustment for each lens barrel unit is made, the zoom lens barrel is assembled according to the above-mentioned sequence. Then, optical adjustments for the entire optical system such as a decentering adjustment and a tilting adjustment between the four lens units U1 to U4 are made.

As an example of the optical adjustments for the entire optical system, an adjustment of the position of a lens unit decentered from the other lens units in the direction orthogonal to the optical axis is made by inserting a tool into the lens barrel unit that holds the lens unit from outside, or by rotating an adjusting screw that exposes on the outer surface of the lens barrel unit. In this case, since the adjustment work can be made within the lens barrel unit holding the lens unit that should be adjusted, the adjustment does not affect the other lens units or lens barrel units. In other words, the adjustment does not change the positions of the lens units held by the other lens barrel units, and does not need disassembly of the other lens barrel units.

As described above, according to this embodiment, since each of the lens barrel units U1 to U4 that hold the first to fourth lens units L1 to L4 is unitized completely and independently, it is possible to easily make the optical adjustment of the lens unit for each lens barrel unit. Moreover, it is possible to make the optical adjustment in the assembled zoom lens barrel without affecting lens units other than the lens unit that should be adjusted.

In addition, it is possible to facilitate the assembly of the zoom lens barrel and the maintenance thereof.

Although a video camera with a lens was described in this embodiment, the present invention is not limited thereto. The present invention can be applied to other image-taking apparatuses such as digital cameras, and lens apparatuses such as interchangeable lenses.

This application claims a foreign priority benefit based on Japanese Patent Applications No. 2005-152263, filed on May 25, 2005, which is hereby incorporated by reference herein in its entirety as if fully set forth herein.

What is claimed is:
1. A lens apparatus comprising:
a plurality of lens units constituting an image-forming optical system that forms an object image; and
a plurality of lens-holding members holding the plurality of lens units, respectively,
wherein each lens unit and each lens-holding member are unitized to form a lens-holding unit, the lens apparatus including a plurality of lens-holding units, and the lens apparatus is formed by joining each of the plurality of lens-holding members to at least one of the other lens-holding members, the joined lens-holding members being fixed in the lens apparatus, wherein the plurality of lens units include first, second, third and fourth lens units, in order from an object side to an image side, and wherein the first lens unit is a fixed lens unit, the second lens unit is a magnification-varying lens unit, the third lens unit is an image-stabilizing lens unit, and the fourth lens unit is a focus lens unit.

2. A lens apparatus comprising:

a plurality of lens units constituting an image-forming optical system that forms an object image; and a plurality of lens-holding members holding the plurality of lens units, respectively, wherein each lens unit and each lens-holding member are unitized to form a lens-holding unit, the lens apparatus including a plurality of lens-holding units, and the lens apparatus is formed by joining each of the plurality of lens-holding members to at least one of the other lens-holding members, the joined lens-holding members being fixed in the lens apparatus, wherein the plurality of lens units include first, second, third and fourth lens units, in order from an object side to an image side, and wherein the first lens unit is a positive lens unit, the second lens unit is a negative lens unit, the third lens unit is a positive lens unit, and the fourth lens unit is a positive lens unit.

3. A lens apparatus comprising:

a plurality of lens units constituting an image-forming optical system that forms an object image; and a plurality of lens-holding members holding the plurality of lens units, respectively, wherein each lens unit and each lens-holding member are unitized to form a lens-holding unit, the lens apparatus including a plurality of lens-holding units, and the lens apparatus is formed by joining each of the plurality of lens-holding members to at least one of the other lens-holding members, the joined lens-holding members being fixed in the lens apparatus, wherein the plurality of lens units include first, second, third and fourth lens units, in order from an object side to an image side, and wherein the plurality of lens-holding members are first, second, third, and fourth lens-holding members holding the first, second, third, and fourth lens units, respectively, the first lens-holding member is joined to the second lens-holding member, the third lens-holding member is joined to the fourth lens-holding member, and the fourth lens-holding member is joined to the second lens-holding member.

4. The lens apparatus according to claim 1, wherein the second lens unit is movable in an optical axis direction, and an actuator unit driving the second lens unit is attached to a second lens-holding member that holds the second lens unit.

5. The lens apparatus according to claim 1, wherein the lens apparatus includes a stop unit, and the stop unit is disposed between the second and third lens units, and joined to a fourth lens-holding member that holds the fourth lens unit.

6. An image-taking apparatus comprising:

the lens apparatus according to claim 1; and an image-pickup element taking the object image formed by the lens apparatus.

7. The lens apparatus according to claim 2, wherein the second lens unit is movable in an optical axis direction, and an actuator unit driving the second lens unit is attached to a second lens-holding member that holds the second lens unit.

8. The lens apparatus according to claim 2, wherein the lens apparatus includes a stop unit, and the stop unit is disposed between the second and third lens units, and joined to a fourth lens-holding member that holds the fourth lens unit.

9. An image-taking apparatus comprising:

the lens apparatus according to claim 2; and an image-pickup element taking the object image formed by the lens apparatus.

10. The lens apparatus according to claim 3, wherein the second lens unit is movable in an optical axis direction, and an actuator unit driving the second lens unit is attached to the second lens-holding member.

11. The lens apparatus according to claim 3, wherein the lens apparatus includes a stop unit, and the stop unit is disposed between the second and third lens units, and joined to the fourth lens-holding member.

12. An image-taking apparatus comprising:

the lens apparatus according to claim 3; and an image-pickup element taking the object image formed by the lens apparatus.

* * * * *